Feb. 12, 1924.
A. ESCHWIG
VEHICLE WHEEL
Filed June 8, 1921
1,483,654
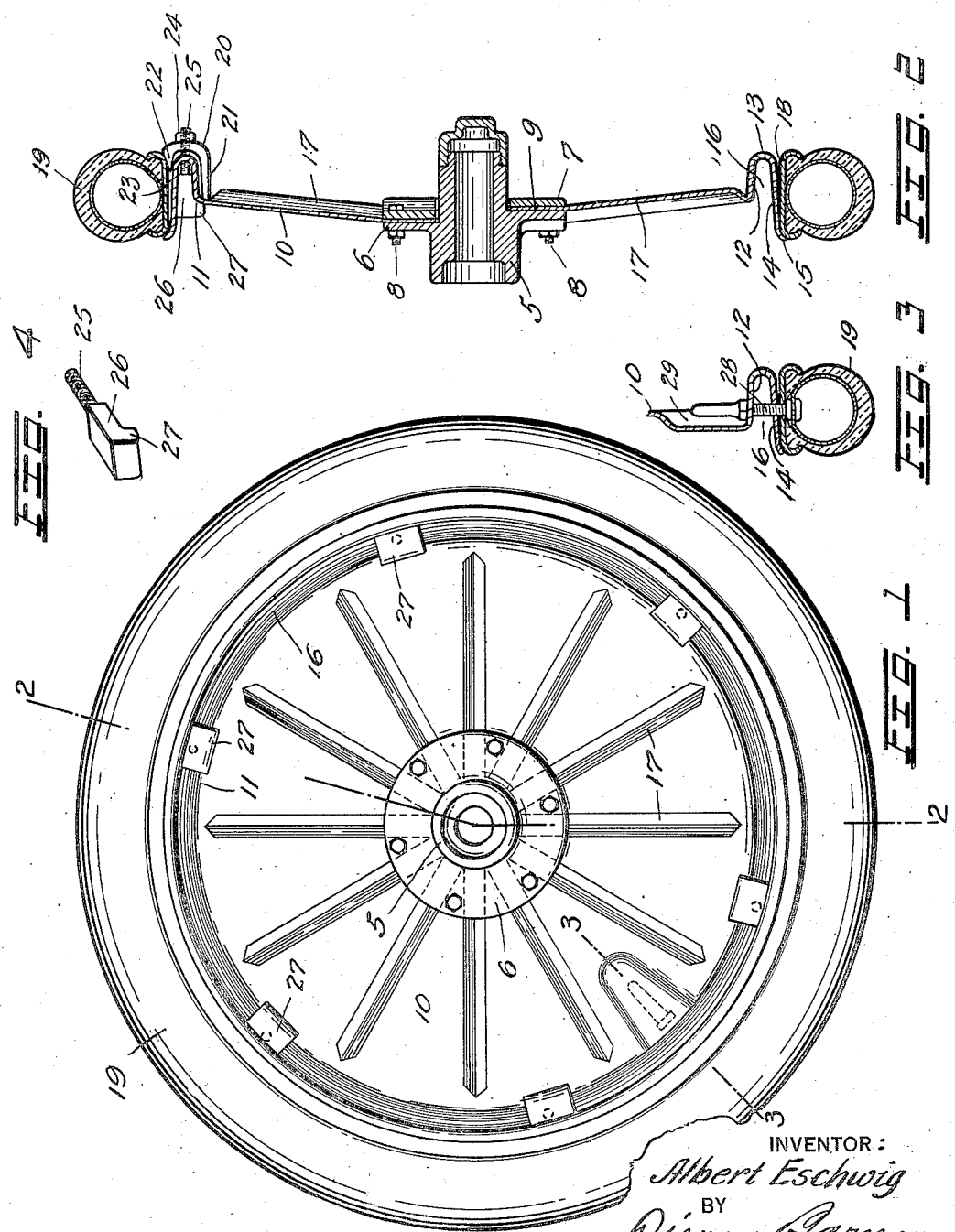
INVENTOR:
Albert Eschwig
BY
Pierre James
ATTORNEY Patented Feb. 12, 1924.

1,483,654

UNITED STATES PATENT OFFICE.

ALBERT ESCHWIG, OF SEATTLE, WASHINGTON.

VEHICLE WHEEL.

Application filed June 8, 1921. Serial No. 475,897.

*To all whom it may concern:*

Be it known that I, ALBERT ESCHWIG, a citizen of the United States, residing at Seattle, in the county of King and State of Washington, have invented certain new and useful Improvements in Vehicle Wheels, of which the following is a specification.

The object of this invention is the provision of a simple, inexpensively constructed and efficient wheel for use, more especially, on motor vehicles. Another object of the invention is to provide a vehicle wheel which is strong and durable and has sufficient resiliency to accommodate itself to road shocks.

A further object is to provide a wheel structure having the above named characteristics and to which a demountable rim for a cushion tire may be conveniently attached.

Still further objects relating to the wheel as a whole and to structural details thereof will appear from the following description.

The invention consists in the novel construction, adaptation and combination of parts hereinafter described and claimed.

In the accompanying drawings,—

Figure 1 is a side elevation of a vehicle wheel embodying the present invention. Fig. 2 is a sectional view taken substantially through 2—2 of Fig. 1. Fig. 3 is a sectional detail through 3—3 of Fig. 1. Fig. 4 is a perspective view of one of the fastening members for the demountable rim.

In said drawings, the reference numeral 5 designates the wheel hub which is preferably provided with a flange 6 integral therewith and a removable flange 7.

Fitting upon the hub 5 between said flanges and secured to the latter, as by bolts 8, is the inner portion 9 of a circular disk.

Said disk is made of a suitable metal, such as steel, and is pressed or otherwise formed to provide an annular web portion 10 extending from the portion 9 to a bend 11, thence extending as a shoulder 12 and a return bend 13 to a rim portion 14 which terminates in a peripheral flange 15. The rim 14 and the shoulder 12 are arranged in substantially cylindrical relations with respect to the wheel axis and afford with the return bend 13 a channel 16 which is arranged circumferentially about the wheel.

The shoulder 12 is of approximately one-half of the width of the rim 14 whereby the outer periphery of the web 10 at the bend 11 is located so as to extend rectangular to the wheel axis and substantially through the midwidth of the rim.

To render the web rigid, the same is desirably formed somewhat conoidal, the hollow side thereof being preferably disposed at the outer side of the wheel. Additional rigidity or stiffness is afforded to the wheel web by forming the same to have a plurality of radially disposed rib elements 17.

These rib elements desirably continue into the central portion 9 of the disk and fit into recesses provided in one of the hub flanges. Detachably mounted on the rim 14 is an auxiliary or "demountable" rim 18 of any well known or suitable type for retaining a cushion tire which may be of a solid elastic character or of a pneumatic character, as represented by 19 in the drawings.

Included in the invention are means for detachably securing the demountable rim 18 upon the wheel rim 14. Said securing means comprises a plurality of substantially L-shaped fittings such as 20, Fig. 2, having a limb 21 engageable against the wheel web part 10 and a shorter limb 22 of a wedge shape to extend into the annular space 23 surrounding the rim 14. The limb 22 is adapted to bear against the demountable rim at the opposite side of the latter from the wheel flange 15.

As shown in Fig. 2, a fitting 20 straddles the return bend 13 of the wheel disk and is secured by means of a nut 24 of a bolt which extends through apertures provided in the fitting 20 and the return bend portion 13 of the wheel disk. The bolt for each of the fittings 20, is provided within the wheel channel 16 with a block bolster element 26 and is provided with a hook shaped head 27 which abuts against the disk at the bend 11.

The block elements 26 of the respective securing bolts fit between the shoulder 12 and rim 14 and serve to maintain the latter in definite spaced relations with respect to said shoulder at the various bolt locations.

In Fig. 3 I illustrate the preferred manner of applying a tire valve 28 by extending the same through both the rim and shoulder elements of the wheel and into a recess 29 provided in web part 10.

Wheels embodying my invention may be advantageously used on motor vehicles as they are capable of carrying heavy loads and are resilient about their peripheries to neutralize shocks and jars with a minimum amount of vibration.

While I have illustrated and described my invention in the form now preferred by me it is apparent that variations in details of construction may be resorted to without departing from the invention and within the scope of the appended claim.

What I claim, is,—

A vehicle wheel, comprising a hub member and a disk secured thereto, said disk member being bent outwardly near its upper end and thence rebent in an opposite direction to provide a rim with a channel open at one end between the rebent portion of the disk, rim supporting bolsters seated within said channel to support rebent portion of the disk in spaced relation relatively to the outwardly bent portion thereof, said bolster being provided with a hook shaped head which abuts the disk at the first mentioned bend thereof, and means extending from said rim supporting bolster through the disk for engagement with the demounted rim lugs to retain a demountable rim upon said disk wheel.

Signed at Seattle, Washington, this 2nd day of June, 1921.

ALBERT ESCHWIG.

Witnesses:
PIERRE BARNES,
MARGARET G. SUPPLE.